United States Patent [19]

Kelly et al.

[11] Patent Number: 4,550,189

[45] Date of Patent: Oct. 29, 1985

[54] SOIL REPELLENTS DERIVED FROM FLUORINATED ACRYLATES AND AROMATIC AMINES

[75] Inventors: Michael G. Kelly, Coventry, R.I.; James H. Covill, Pineville, N.C.

[73] Assignee: American Hoechst Corporation, Somerville, N.J.

[21] Appl. No.: 697,293

[22] Filed: Feb. 1, 1985

Related U.S. Application Data

[63] Continuation of Ser. No. 410,737, Aug. 23, 1982.

[51] Int. Cl.$^4$ .......................................... C07C 101/447
[52] U.S. Cl. ........................................ 560/044; 560/9;
560/12; 560/13; 560/36; 560/43; 106/2;
428/245; 252/8.6
[58] Field of Search ................. 560/13, 9, 36, 43, 44, 560/12

[56] References Cited

U.S. PATENT DOCUMENTS

| | | | |
|---|---|---|---|
| 3,171,861 | 3/1965 | Ahlbrecht | 568/842 |
| 3,547,861 | 12/1970 | Anello et al. | |
| 3,657,320 | 4/1972 | Anello et al. | |
| 3,719,698 | 3/1973 | Tesoro et al. | 8/128 R X |
| 3,818,074 | 6/1974 | Ahlbrecht | 560/223 |
| 3,870,748 | 3/1975 | Katsushima et al. | 260/31.8 HA X |
| 3,879,440 | 4/1975 | Anello et al. | 560/43 X |

FOREIGN PATENT DOCUMENTS 54-133485 10/1979 Japan .
54-133486 10/1979 Japan .

*Primary Examiner*—Bernard Helfin
*Attorney, Agent, or Firm*—John P. Blasko; Hugh C. Crall

[57] ABSTRACT

Soil repellents derived from fluorinated acrylates and aromatic amines are disclosed which have excellent durability and resistance to laundering. The compounds are represented by the formula

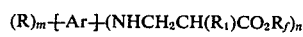

$(R)_m\text{-}(Ar)\text{-}(NHCH_2CH(R_1)CO_2R_f)_n$ wherein n is 1 to 3 and m is 0 to 4, Ar is an aromatic radical containing from 1 to 3 benzene rings which may be fused together or linked through a single carbon-carbon bond or a linking group, $R_f$ is a fluorinated radical, $R_1$ is H or $CH_3$, and R is independently selected from lower alkyl, lower alkoxy, halogen, hydroxy, nitro, cyano, amino, lower alkylamino, lower acylamino, —$CO_2R_3$ and —$NHCH_2CH(R_1)CO_2R_3$ wherein $R_3$ is lower alkyl, —$CH_2CH_2OH$, or —$CH_2CH(OH)CH_2Cl$. Also disclosed are polyester and nylon fibers having these compounds incorporated therein.

10 Claims, No Drawings

SOIL REPELLENTS DERIVED FROM FLUORINATED ACRYLATES AND AROMATIC AMINES

This is a continuation of application Ser. No. 410,737, filed on Aug. 23, 1982.

BACKGROUND OF THE INVENTION

This invention relates to fluorinated compositions which impart oil and water repellency to synthetic fibers, particularly polyester and nylon fibers, and thus function as anti-soil agents. In particular, this invention relates to fluorinated compositions derived from fluorinated acrylates and aromatic amines.

DESCRIPTION OF THE PRIOR ART

Compounds containing fluorinated groups are broadly known for use as anti-soil agents for synthetic fibers. Fluorinated polyacrylates are disclosed in U.S. Pat. No. 3,171,861, U.S. Pat. No. 3,547,861 and U.S. Pat. No. 3,818,074. These compositions are generally not suitable for application to fibers prior to manufacture of textile fabric or prior to the dyeing of such fabric. In U.S. Pat. No. 3,646,153 fluorinated compositions which are compatible with the fiber-forming polymer are disclosed but these tend to be removed from the fiber upon laundering.

Fluorinated carbamates, derived from the reaction of perfluoroalkanols with isocyanates, are disclosed in U.S. Pat. No. 3,657,320. Typical of these is the compound having the formula

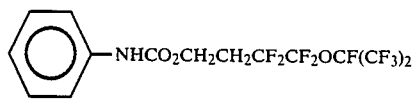

which is shown in Example 10 of said patent. Fluorinated carbamates are also disclosed in No. J54-133,485. Specifically, a water soluble dispersion of the compounds

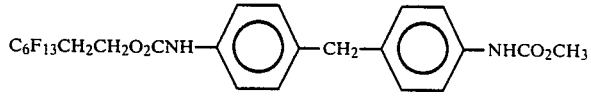

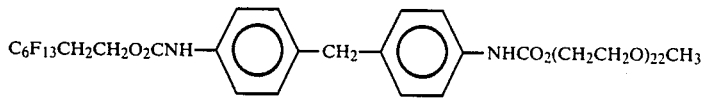

Polyfluorinated derivatives of amines and amine salts are disclosed in U.S. Pat. No. 3,719,698. Exemplified are compounds of the formula

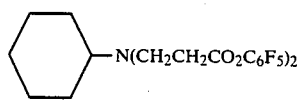

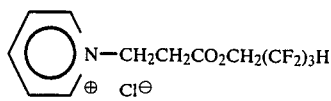

which are depicted in columns 1 and 3 of said patent respectively. In U.S. Pat. No. 3,870,748 compositions derived from polyfluorinated epoxides and carboxylic acids or amines are disclosed. The compound having the formula

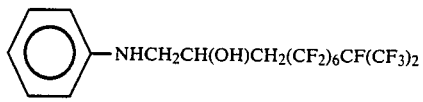

is illustrated in column 9 of said patent.

SUMMARY OF THE INVENTION

Applicants have discovered a novel group of fluorinated compositions derived from fluorinated acrylates and aromatic amines which have excellent anti-soiling properties, durability and resistance to laundering when incorporated in polyester and nylon fibers. The compounds of the present invention may be depicted by the formula

wherein
n is 1 to 3 and m is 0 to 4;
Ar is an aromatic radical containing from 1-3 benzene rings which may be fused together or linked through a single carbon-carbon bond or a linking group selected from $-O-$, $-S-$, $-SO_2-$, $-NH-$, $-NHCO-$, $-CH_2N(R_2)CH_2-$, $-CO-$, $-C_aH_{2a}$, $>CH-$, $-CO_2C_bH_{2b}O_2C-$, and $C_bH_{2b-1}-O_2C-$ wherein a is 1 to 6, b is 2 to 6, and $R_2$ is H, lower alkyl or phenyl,
R is independently selected from lower alkyl, lower alkoxy, halogen, hydroxy, nitro, cyano, amino, lower alkylamino, lower acrylamino, $-CO_2R_3$ and $-NHCH_2(CH(R_1)CO_2R_3$ wherein $R_3$ is lower alkyl, $-CH_2CH_2OH$, or $-CH_2CH(OH)CH_2Cl$;
$R_1$ is H or $CH_3$; and
$R_f$ is a fluorinated radical of the formula $-W(C_dF_{2d})Y$ wherein W has from 1 to 10 carbon atoms and selected from alkylene and $W'-Z-(W'')_e$ where $W'$ and $W''$ are alkylene,
Z is O, S, NHCO, or $NHSO_2$, and e is 0 or 1, Y is hydrogen, fluoro, or perfluoroalkoxy of 1 to 6 carbon atoms, and d is 2 to 20. Compounds found to be particularly advantageous are those wherein Ar contains 2 or 3 benzene rings and n is 2 or 3. In the above formulation it is intended that the fluorinated radical $R_f$ may be straight, branched or cyclic in any of its alkylene or perfluoroalkylene chains. The term lower, such as in lower alkyl, is intended to embrace moieties of 1 to 4 carbon atoms.

The subject compounds have an excellent affinity for polyester and nylon fibers and may be incorporated with the raw or partially finished fiber by several methods. In one method the additive may be melt blended with the resin then extruded to form a fiber. In a second method the fiber may be treated with a solution, dispersion or emulsion of the additive in liquid medium, typically a solution in organic solvent or an aqueous emulsion. Either method is generally followed by subsequent heat treatment of annealing of the fiber.

The present compounds are sufficiently compatible with the resin that they become an integral part of the fiber, yet the incompatibility imparted by the fluorinated groups, and the mobility of the compounds, is sufficient to concentrate the compounds at the surface of the fiber, making the fiber hydrophobic and oleophobic. Once incorporated into the fiber surface, the present compounds resist being abraded or washed away because of their affinity for the resin and because of the low solubility of the compounds in aqueous soap solutions and dry cleaning solvents. The present compounds also allow satisfactory dyeing of the treated fiber, or may be applied together with a dyestuff from the same bath.

The present invention also includes polyester and nylon fibers, especially those derived from polyethylene terephthalate (PET) and nylon-6 and nylon-66, which have incorporated therewith at least one compound as defined above, and a process for producing such fibers which comprises contacting the fiber with a liquid emulsion, dispersion or solution containing at least one compound as defined above, and thereafter heat treating or annealing the fiber to impart oil and water repellency.

DESCRIPTION OF THE PREFERRED EMBODIMENTS

Preferred compounds within the composition defined by the formula

are those wherein Ar is selected from benzene, naphthalene, benzene-L-benzene, and benzene-L-benzene-L-benzene wherein L is independently selected from a single carbon-carbon bond or a linking group selected from —O—, —S—, —SO$_2$, —NH—, —CO—, —CONH—, —NHCO—, —C$_a$H$_{2a}$—, and —CO$_2$C$_b$H$_{2b}$O$_2$C—, and wherein R, R$_1$, R$_f$, m, n, a, and b are as previously defined. Within this preferred group, compounds which are more preferred may be depicted by the following formulae:

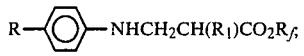

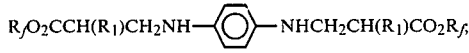

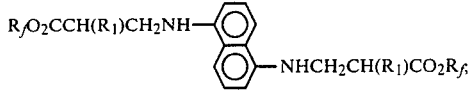

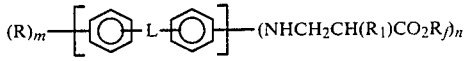

wherein n is 1 to 2 and m is 0 to 2;

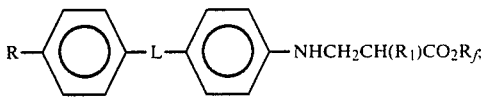

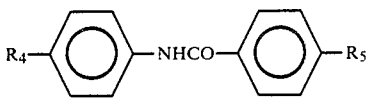

wherein R$_4$ and R$_5$ are —NHCH$_2$CH(R$_1$)CO$_2$R$_f$

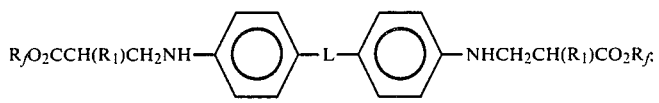

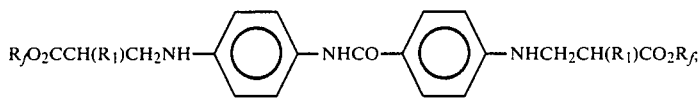

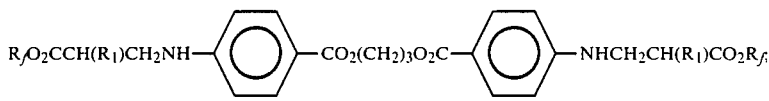

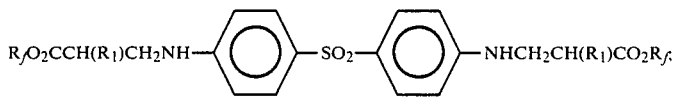

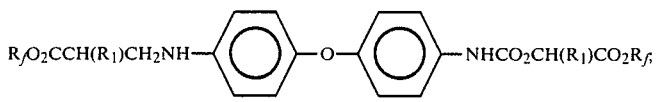

-continued

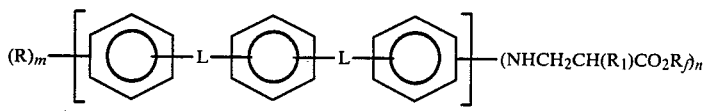

wherein n is 1 to 3 and m is 0 to 3;

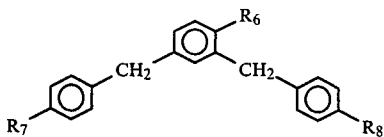

wherein $R_6$, $R_7$ and $R_8$ —$NHCH_2CH(R_1)CO_2R_f$ and the others are R;

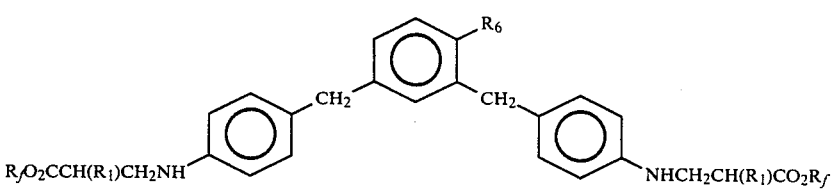

wherein $R_6$ is —$NHCH_2CH(R_1)CO_2R_f$ or R;

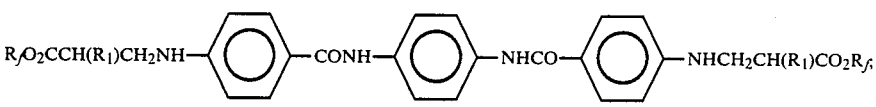

and

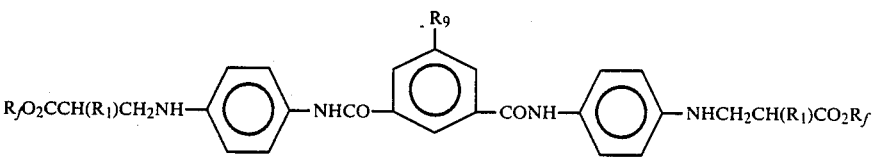

wherein $R_9$ is —$NHCH_2CH(R_1)CO_2R_f$ or R. IN the above formulae R is particularly selected from hydroxy, amino, lower alkylamino, lower acylamino and —$NHCH_2CH(R_1)CO_2R_3$. It is also preferred that $R_f$ has the formula —$W(C_dF_{2d})Y$ wherein W is alkylene of 2 to 6 carbon atoms, d is 2 to 12 and Y is hydrogen, fluoro, or perfluoroalkoxy of 1 to 6 carbon atoms. It is most preferred that $R_1$ is H and $R_f$ is selected from —$CH_2CH_2(CF_2)_gCF_3$ and —$CH_2CH_2(CF_2)_hOCF(CF_3)_2$ wherein g is 5 to 11 and h is 2 to 12.

The compounds of the present invention may be readily synthesized by addition of a fluorinated acrylate to an aromatic amine as follows:

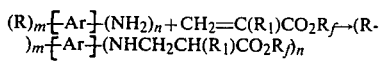

This reaction is well-known and generally proceeds under acidic conditions, typically acetic acid catalyzed, and at elevated temperatures, typically reflux.

The starting aromatic amines are known in the art and are readily available or easily synthesized using conventional synthetic routes. The fluorinated acrylates $CH_2=C(R_1)CO_2R_f$ are prepared by the conventional esterification of acrylic or methacrylic acid with a fluorinated alcohol ($R_f$—OH). Alternatively, acryloyl or methacryloyl chloride can be reacted with the fluorinated alcohol. Such acrylates and/or their alcohol precursors are described in U.S. Pat. No. 3,171,861, U.S. Pat. No. 3,547,861, U.S. Pat. No. 3,719,698, U.S. Pat. No. 3,818,074 and U.S. Pat. No. 4,209,610, the disclosures of which are incorporated herein by reference.

Typical of the fluorinated alcohols used as precursors to make the fluorinated acrylates are those having the formula HO—$W(C_dF_{2d})Y$ wherein W, Y and d are as previously defined. The preferred fluorinated alcohols, because of their commercial availability, are the perfluoroalkylethanols and omega-perfluoroisopropoxy-perfluoroalkyl ethanols having two to twelve carbon atoms in the perfluoroalkyl groups, as well as the propanol homologues thereof. Most preferred are the perfluoroalkyl ethanols having six to twelve carbon atoms in the perfluoroalkyl groups, and mixtures thereof.

The soil-repellent compounds of the present invention may be incorporated into polyester or nylon fibers using several known methods. In one method the compound is blended with the resin prior to being extruded into fibers. In another method, the compound may be applied to the fiber by absorption from a liquid medium, for example as a solution in an organic solvent or as an emulsion or dispersion in aqueous medium. In either method the fibers are generally annealed at elevated temperatures after treatment. Typically the compounds are incorporated in the fibers in an amount of from about 0.1 to 1% by weight and the treated fibers are annealed at temperatures of about 100° to 200° C. for about 1 to 240 minutes to impart the desired soil repellency. Further details of the above methods are disclosed in U.S. Pat. No. 4,209,610 and U.S. Pat. No. 4,219,625 which are incorporated herein by reference.

The invention may be described in greater detail by the following examples in which the parts and percentages are by weight. In each of the examples the perfluoroalkyl acrylate employed was derived from a mixture of perfluoroalkyl ethanols having six to twelve carbon atoms in the perfluoroalkyl group. Thus, the fluorinated acrylate may be represented by the formula $CH_2=CHCO_2R_f$ wherein $R_f$ is $-CH_2CH_2(CF_2CF_2)_nCF_2CF_3$ and n is 2 to 5. The reactions were conducted in standard laboratory equipment, typically 50 ml and 100 ml round bottom flasks equipped with reflux condenser, magnetic stirrer and thermometer, with heat being supplied by a standard heating mantle with variable voltage control.

EXAMPLE 1

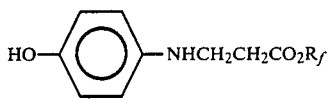

p-Hydroxyaniline (1.0 g, 0.0092 mole) was dissolved in 10.0 grams of acetic acid. Perfluoroalkyl ethyl acrylate (hereinafter "PFAEA") (5.0 g, 0.010 mole) was added and the mixture heated to reflux. After two hours at reflux, the reaction mixture was drowned into 250 mls of water and the product recovered as a dark, tacky solid which was dried under vacuum.

EXAMPLE 2

PFAEA (9.28 g, 0.018 mole) was stirred with 15 mls of acetic acid and nitrogen was bubbled through the system for 10 minutes. With a nitrogen blanket 1,4-phenylene diamine (0.0088 mole, 0.955 g) was added. The temperature was raised to reflux and held until no change in the acrylate level could be detected by GC (about 24 hours). The reaction mixture was drowned into 1000 mls of ice water, filtered and washed with 1000 mls of cold water and the product isolated as a tacky, violet colored solid. The product was reprecipitated from hot methanol and dried (m.p. 69°-74° C.)

EXAMPLE 3

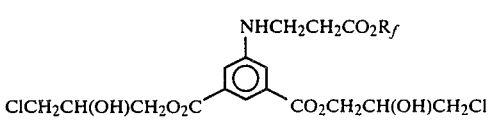

PFAEA (10.0 g, 0.02 mole) and 5-aminoisophthalic acid (3.6 g 0.02 mole) were refluxed in acetic acid (25 g) for two days, then NMP (18 g) was added to increase solubility and reflux continued for another day. The product, after isolation, was then reacted at 60° C. with epichlorohydrin (25 ml) in 25 g NMP and 1 ml triethylamine catalyst. The product was isolated by drowning into water, filtering, dissolving in methylene chloride, washing with water and evaporating the solvent.

EXAMPLE 4

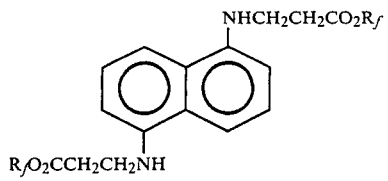

PFAEA (10.0 g, 0.02 mole) and 10.0 grams of acetic acid was flushed with nitrogen, then 1.6 grams of 1,5-diaminonaphthalene was added and the mixture heated to reflux. After 10 hours the reaction mixture was drowned into 300 mls of cold water, washed and dried under vacuum to yield 8.8 grams. (75.8% of theoretical) of a violet colored product.

EXAMPLE 5

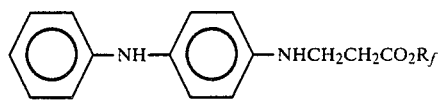

PFAEA (5.1 g, 0.01 mole) and p-amino diphenylamine (1.8 g, 0.01 mole) were refluxed in acetic acid (15 g) until the reaction was complete and the product isolated by drowning into water and washing to remove acetic acid. The tarry residue was dissolved in acetone, decolorized with activated charcoal, and the acetone evaporated to give a greyish green product.

EXAMPLE 6

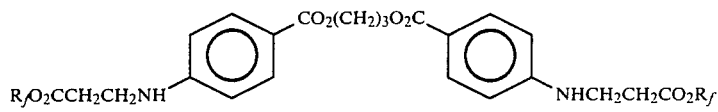

Polacure 740 M (1.5 g, 0.005 mole) and PFAEA (5.0 g, 0.01 mole) were dissolved in acetic acid (5 g) and heated to reflux. After 8 hours the reaction mixture was drowned in 150 mls cold water, filtered, washed and dried under vacuum to yield 5.2 g (80% yield) of beige solid.

EXAMPLE 7

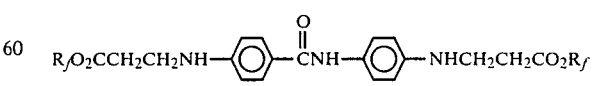

4,4'-Diamino benzanilide (2.2 g, 0.010 mole) was dissolved in acetic acid (20.0 grams) then PFAEA (10.0 g, 0.020 mole) was added and the solution heated to reflux. After 16 hours the reaction mixture was drowned into 300 mls of water, filtered, washed, and dried to yield 9.3 grams (77.5% of theoretical) of product.

EXAMPLE 8

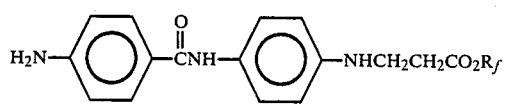

Prepared as in Example 7, except that PFAEA was reacted with the diamino benzanilide in a 1 to 1 mole ratio.

EXAMPLE 9

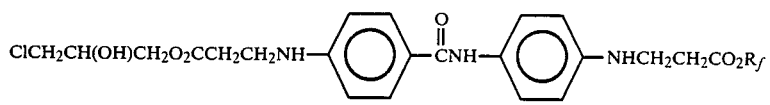

The compound of Example 8 (7.4 g, 0.010 mole) was dissolved in 16.0 grams of acetic acid then 3-chloro-2-hydroxypropyl acrylate (1.8 g, 0.011 mole) was added to this solution and the mixture heated to reflux. After 6 hours the reaction mixture was drowned into 400 mls of ice water, filtered, washed and dried in vacuo.

EXAMPLE 10

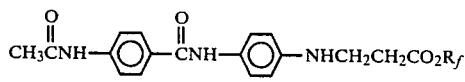

The compound of Example 8 (5.0 g) was mixed with a large excess of acetic anhydride (30.0 g) and with sodium acetate catalyst. The reaction mixture was heated to 115° C. and held until the starting amine was no longer visible by TLC, at which point it was drowned into 300 mls of water. The product separated from the water as an oil which was then dissolved in methylene chloride and washed with water, dried over magnesium sulfate and then the methylene chloride stripped off.

EXAMPLES 11 to 13

The following compounds were prepared by refluxing the appropriate diamine with PFAEA (1 to 2 mole ratio) in acetic acid until the reaction was complete and isolating the product by drowning into water, filtering, washing and drying under vacuum.

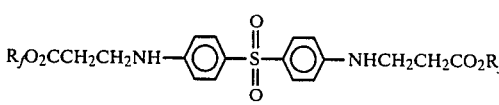

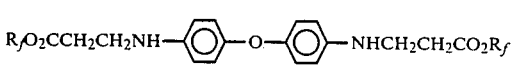

Ex. 13

$R_fO_2CCH_2CH_2NH$—⟨⟩—O—⟨⟩—$NHCH_2CH_2CO_2R_f$

EXAMPLE 14

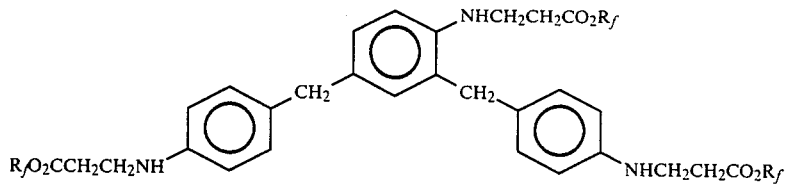

2,4-Bis(p-aminobenzyl)aniline (1.2 g, 0.004 moles) was dissolved in 5.0 grams of acetic acid, then PFAEA was added (6.3 grams, 0.012 mole) and the mixture heated to reflux. After 5 hours the reaction mixture was drowned into 150 mls of cold water, washed and dried under vacuum.

EXAMPLE 15

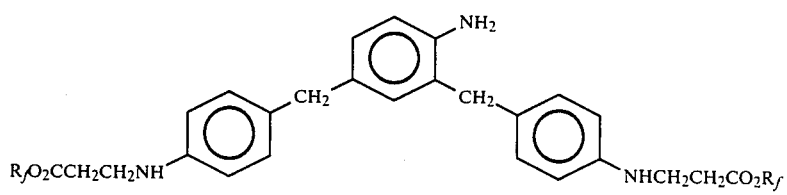

Prepared as in Example 14 using two moles of PFAEA per mole pf aromatic amine and refluxing for 2.5 hours.

EXAMPLE 16

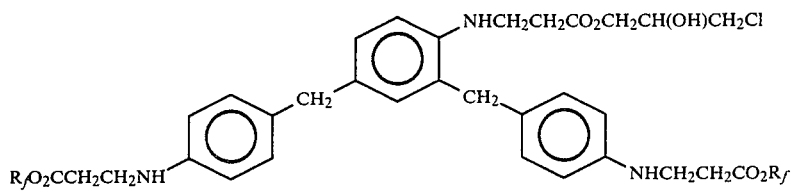

2,4-Bis(p-aminobenzyl)aniline (3.0 g) and PFAEA (10.0 g) were refluxed for about one hour in 30.0 g acetic acid, then 3-chloro-2-hydroxypropyl acrylate (1.6 g) were added and the mixture held at reflux for several hours. The product was isolated in the usual manner and dried.

EXAMPLES 17–18

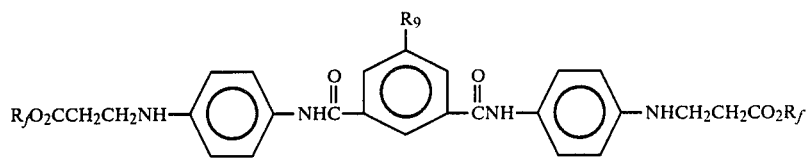

R₉ = NH₂      Ex. 17

R₉ = NHCH₂CH₂CO₂R_f      Ex. 18

Prepared by refluxing in acetic acid PFAEA and N,N'-bis(4-aminophenyl)-5-amino-1,3-benzenedicarboxamide in 2 to 1 and 3 to 1 molar ratios respectively and isolating in the usual manner.

EXAMPLES 19 to 23

In a manner similar to the above examples, the following compounds were prepared:

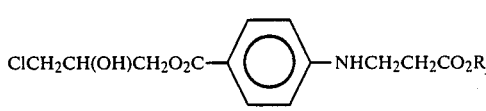 Ex. 19

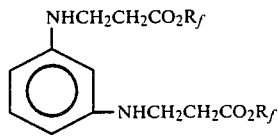 Ex. 20

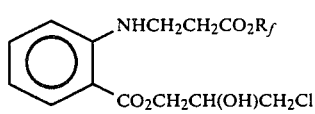 Ex. 21

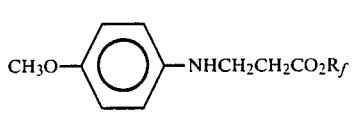 Ex. 22

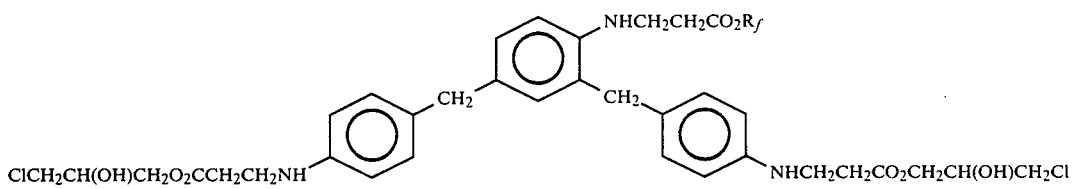 Ex. 23

Application of Compounds to Fiber

Each of the compounds prepared in Examples 1 to 26 was applied to fiber by dissolving the compound in acetone and applying it to nylon and polyester fabric through a padder. The concentration of compound in the solution was adjusted so that pick up was 0.25% compound compared to the weight of the fabric. After drying at room temperature, the fabric was cured (annealed) at 140° C. (nylon) or 160° C. (polyester) for 30 minutes.

The treated fabrics were then subjected to AATCC Test 61-1968 Wash IIA or IIIA using a launderometer from Atlas Electric Company to simulate five home launderings at medium or high temperature settings. The washed fabric was evaluated for oil repellency according to AATCC Test 118-1975, the rating scale running from 0–8 with increasing numbers indicating greater repellency. Each fabric was also tested before washing as well as after the wash tests. For long term washfastness the more rigorous IIIA Test was carried out repeatedly, each repeat simulating five home launderings at high temperature. The results of the testing for oil repellency are shown in Table I.

TABLE I

OIL REPELLENCY*

| Ex. No. | Fabric | After Cure | After II A Wash | After III A wash 1X | 2X | 3X | 4X | 5X |
|---|---|---|---|---|---|---|---|---|
| 1 | P | 4 (5) | 2 | 2 | 0 | — | — | — |
|   | N | 6 (7) | 6 | 2 | 0 | — | — | — |
| 2 | P | 7 (6) | 7 (6) |   |   |   |   |   |
|   | N | 6 (6) | 5 (6) |   |   |   |   |   |
| 3 | P | 4 | 2 |   |   |   |   |   |
|   | N | 6 | 6 |   |   |   |   |   |
| 4 | P | 7 (7) | 6 | 6 | 6 | 6 | 6 | 6 |
|   | N | 7 (6) | 6 | 6 | 6 | 6 | 6 | 6 |
| 5 | P | 2 | 0 |   |   |   |   |   |
|   | N | 6 | 5 |   |   |   |   |   |

TABLE I-continued

| Ex. No. | Fabric | After Cure | After II A Wash | After III A wash ||||  |
|---|---|---|---|---|---|---|---|---|
| | | | | 1X | 2X | 3X | 4X | 5X |
| *6 | P | 6 (6) | 5 (3) | 3 | 1 | 1 | 2 | — |
| | N | 6 (6) | 6 (6) | 7 (6) | 5 (5) | 1 (2) | 0 (1) | 0 |
| *7 | P | 6 (7) | 6 (6) | 6 | 3 | 1 | — | — |
| | N | 6 (6) | 5 (7) | 6 | 5 | 5 | 2 | 0 |
| *8 | P | 6 (5) | 6 (5) | 3 | 3 | 0 | 0 | — |
| | N | 6 (6) | 5 (6) | 6 | 6 | 6 | 4 | — |
| 9 | P | 6 | 4 | | | | | |
| | N | 6 | 6 | | | | | |
| 10 | P | 5 (5) | 4 | 2 | 0 | 0 | 0 | 0 |
| | N | 6 (6) | 6 | 1 | 0 | 0 | 0 | 0 |
| 11 | P | 5 | 2 | | | | | |
| | N | 6 | 4 | | | | | |
| 12 | P | 6 (5) | 5 | 5 | 1 | 2 | 0 | 0 |
| | N | 7 (6) | 6 | 6 | 5 | 2 | 0 | 0 |
| 13 | P | 7 (6) | 6 | 4 | 2 | 0 | 0 | 0 |
| | N | 6 (6) | 1 | 1 | 0 | 0 | 0 | 0 |
| 14 | P | 7 (7) | 6 (7) | 7 | 6 | 3 | 6 | — |
| | N | 6 (6) | 6 (7) | 7 | 6 | 4 | 0 | — |
| 15 | P | 7 (7) | 6 (6) | 6 | 6 | 5 | 6 | — |
| | N | 6 (6) | 6 (6) | 6 | 6 | 6 | 6 | — |
| 16 | P | 7 | 4 | — | — | — | — | — |
| | N | 7 (6) | 5 | 6 | 2 | 1 | 0 | 0 |
| 17 | P | 6 | 5 | | | | | |
| | N | 6 | 6 | | | | | |
| 18 | P | 6 | 4 | | | | | |
| | N | 6 | 5 | | | | | |
| 19 | P | 5 (2) | 3 (0) | | | | | |
| | N | 6 (5) | 5 (4) | | | | | |
| 20 | P | 5 | 2 | | | | | |
| | N | 6 | 3 | | | | | |
| 21 | P | 2 | 0 | | | | | |
| | N | 5 | 4 | | | | | |
| 22 | P | 2 | 0 | | | | | |
| | N | 4 | 2 | | | | | |
| 23 | P | 6 | 1 | | | | | |
| | N | 6 | 2 | | | | | |

*Numbers in parentheses are additional test results.

What is claimed is:

1. A compound of the formula:

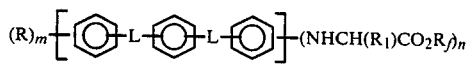

wherein n is 2 to 3 and m is 0 to 1; m+n equal 3;

L is a single carbon-carbon bond or a linking group selected from —O—, —S—, —SO$_2$—, —NH—, —NHCO—, —CH$_2$N(R$_2$)CH$_2$—, —CO—, and —C$_a$H$_{2a}$—;

wherein a is 1 to 6, and R$_2$ is H, lower alkyl or phenyl;

R is independently selected from lower alkyl, lower alkoxy, halogen, hydroxy, nitro, cyano, amino, lower alkylamino, lower acylamino, —CO$_2$R$_3$ and —NHCH$_2$(R$_1$)CO$_2$R$_3$, wherein R$_3$ is lower alkyl or —CH$_2$CH$_2$OH;

R$_1$ is H or CH$_3$; and

R$_f$ is a fluorinated radical of the formula —W(C$_b$F$_{2b}$)Y wherein W has from 1 to 10 carbon atoms and is selected from alkylene and W'—Z—(W'')$_c$ where W' and W'' are alkylene, Z is O, S, NHCH, or NHSO$_2$, and C is 0 to 1, Y is hydrogen, fluoro, or perfluoroalkoxy of 1 to 6 carbon atoms, and b is 2 to 20.

2. A compound according to claim 1 wherein L is a linking group selected from —CH$_2$—, —NHCO—, and —CONH—.

3. A compound according to claim 2 having the formula:

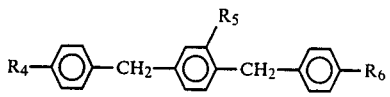

wherein at least two of R$_4$, R$_5$, and R$_6$ are —NHCH$_2$CH(R$_1$)CO$_2$R$_f$ and the other is selected from amino, lower alkylamino, lower acrylamino, and —NHCH$_2$CH(R$_1$)CO$_2$R$_3$.

4. A compound according to claim 3 wherein both R$_4$ and R$_6$ are —NHCH$_2$CH(R$_1$)CO$_2$R$_f$.

5. A compound according to claim 4 wherein R$_5$ is —NHCH$_2$CH(R$_1$)CO$_2$R$_f$.

6. A compound according to claim 4 wherein R$_5$ is —NH$_2$.

7. A compound according to claim 2 having the formula:

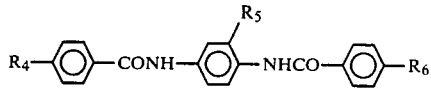

wherein at least two of R$_4$, R$_5$, R$_6$ are —NHCH$_2$CH(R$_1$)CO$_2$R$_f$ and the other is selected from amino, lower alkylamino, lower acylamino, and —NHCH$_2$CH(R$_1$)CO$_2$R$_3$.

8. A compound according to claim 7 wherein both R$_4$ and R$_6$ are —NHCH$_2$CH(R$_1$)CO$_2$R$_f$.

9. A compound according to claim 8 wherein R$_5$ is —NHCH$_2$CH(R$_1$)CO$_2$R$_f$.

10. A compound according to claim 8 wherein R$_5$ is NH$_2$.

* * * * *